Nov. 30, 1943.   F. H. ROBY   2,335,699
METHOD AND SYSTEM FOR ELECTRIC WELDING
Filed April 21, 1941   3 Sheets-Sheet 3

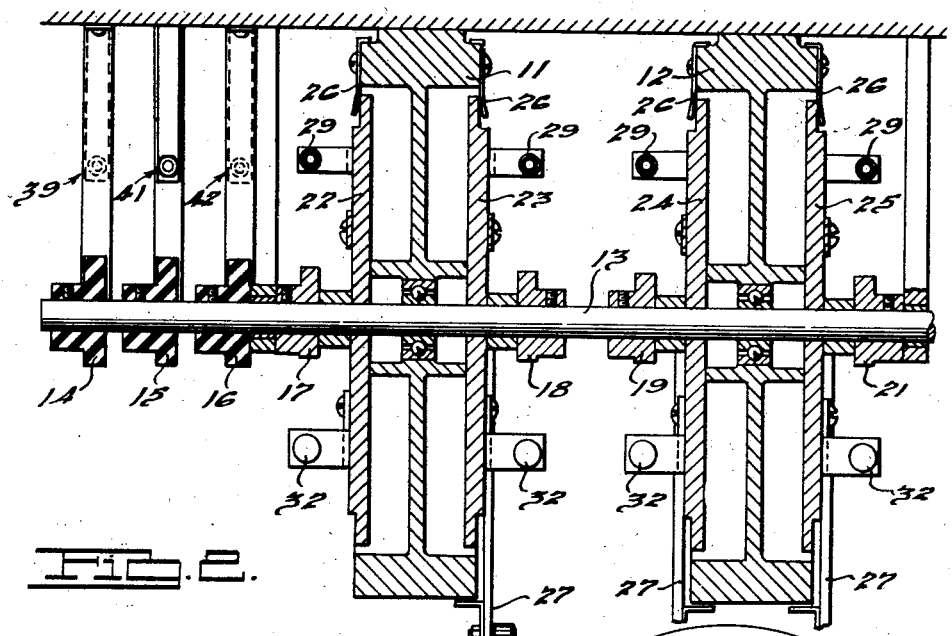
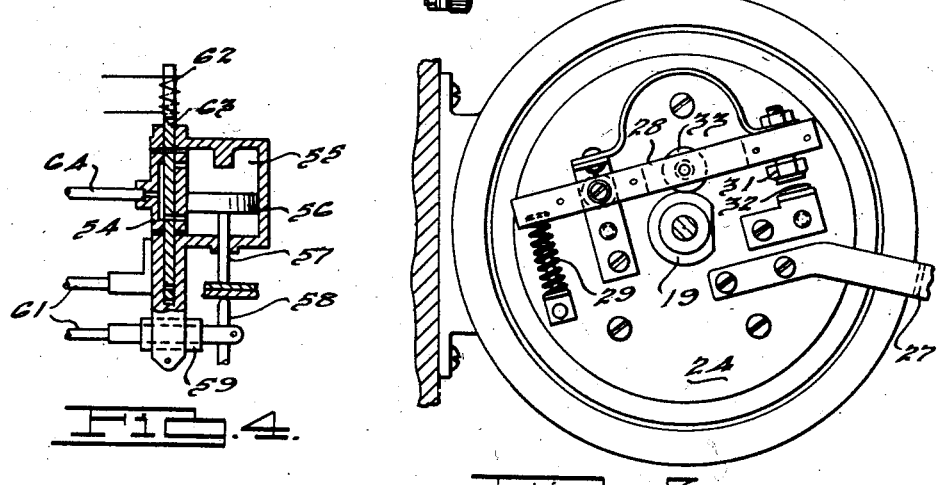
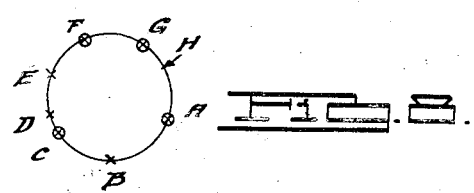

INVENTOR
Frank H. Roby.
BY
ATTORNEY

Patented Nov. 30, 1943

2,335,699

UNITED STATES PATENT OFFICE 2,335,699

METHOD AND SYSTEM FOR ELECTRIC WELDING

Frank H. Roby, Milwaukee, Wis., assignor to Square D Company, Detroit, Mich., a corporation of Michigan Application April 21, 1941, Serial No. 389,548

14 Claims. (Cl. 219—4)

This invention relates primarily to a method of and system for electric welding.

One object of the invention is to provide an improved, accurate and simplified method and system of electric welding, providing for "delay," "squeeze," "weed," "hold" and "off" periods in a complete welding cycle.

Another object of the invention is to provide a motor driven welding timer in which the motor is started for each single weld and for the first weld in a series of welds, in which provision is made for stopping the motor in a definite predetermined position of the timing device.

Another object of the invention is to provide a motor driven timing device in a welder control system, with a capacitor plugging arrangement to provide for positive positioning of the motor at rest.

Another object of the invention is to provide a welder control system utilizing a motor driven timer in which the timing period elapsing between the closing of the initiating control and the making of the first weld is substantially constant.

Another object of the invention is to provide a method and system of electric welding utilizing a motor driven timer in which a "delay" time, in addition to the "squeeze" time, is incorporated in each single welding cycle and in each initial cycle of a series of welding cycles.

Another object of the invention is to provide a new and improved method and system of plugging or braking alternating current motors.

Other objects and features of the invention will be readily apparent to those skilled in the art from the specification and appended drawings illustrating certain preferred embodiments in which:

Figure 2 is a horizontal sectional view taken on the line II—II of Figure 1.

Figure 3 is a sectional view on the line III—III of Figure 1.

Figure 4 is a schematic representation of a welding machine on which the method and system of this invention may be practiced.

Figure 6 is a diagrammatic view of the wiring connections and equipment exterior to the panel of Figure 5.

Figure 1:
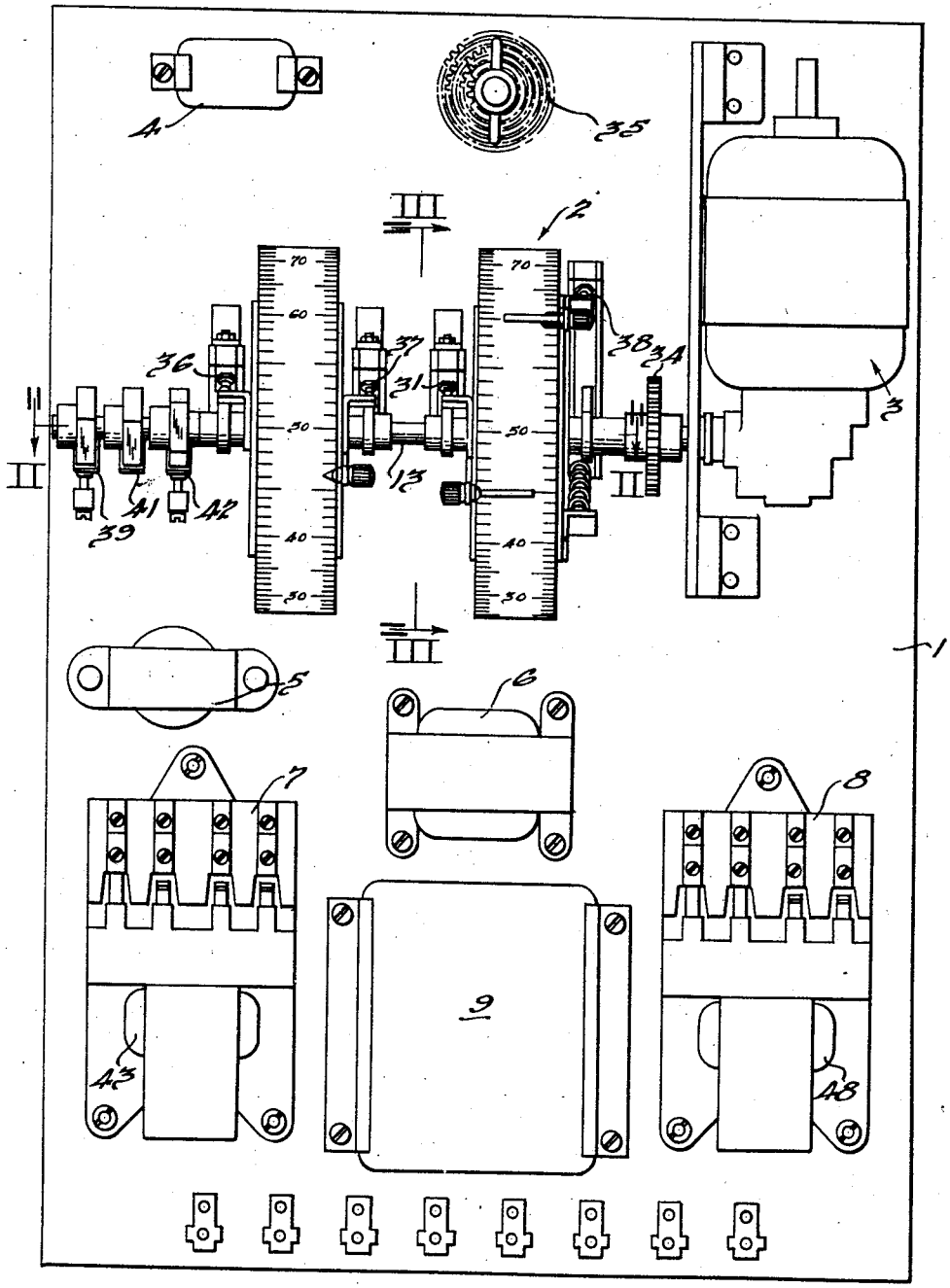
Figure 1 is a front elevational view of a control panel for the method and system according to the present invention.

The panel of Figure 1 includes the mounting board or support 1 having disposed thereon the motor driven timing switch indicated generally at 2, driven through a split winding, capacitor type, synchronous motor indicated generally at 3. A condenser 4 is provided for one of the motor windings and also provided on the board are a reactor 5, a control transformer 6, a pair of electromagnetically operated electric switches 7 and 8, and a plugging condenser 9.

The timing switch 2 shown more particularly in Figures 1, 2 and 3, comprises a pair of stationary supporting members 11 and 12 having central hubs containing bearings in which is rotatably disposed the operating shaft 13 upon which are mounted the contact operating cams 14, 15, 16, 17, 18, 19, and 21. On opposite sides of the stationary supports 11 and 12 are rotatably mounted the contact supporting plates 22, 23, 24 and 25, these plates being normally held stationary by the spring clips indicated at 26, but being rotatable by means of handle elements 27 rigidly mounted on the plates so that their relation with respect to the operating shaft 13 and the cams may be adjusted. Upon each of the plates 22, 23, 24 and 25 are pivotally mounted contact arms 28 biased by springs 29 toward contacts engaged position. Contact arms 28 carry movable contact 31 adapted to cooperate with stationary contacts 32 on the plates. The contact arms 28 carry rollers 33 which engage their respective cams to effect rotation of the contact arms to effect engagement and disengagement of the cooperating contacts 31 and 32. The shaft 13 is driven through gearing 34 and through a reduction gear mechanism incorporated in the motor 3 and the speed of rotation of the shaft 13, and hence the speed to the welding cycle may be varied by changing the gearing 34, a suitable group of interchangeable gear elements being provided on the panel at 35. The movable contact on plate 24 has been indicated at 31. A similar movable contact on plate 22 is indicated at 36 and the movable contacts on plates 23 and 25 are indicated at 37 and 38 respectively. At the left hand end of shaft 13 and cooperating with the insulating cam elements 14, 15 and 16 are three relatively light sets of contacts 39, 41 and 42. The contact sets 39 and 42 are formed to be closed on the high part of the cam and contact set 41 is formed to be open on the high part of the cam. The points of operation of the cams 14, 15 and 16 may be determined by varying their position upon the shaft 13. Ordinarily, the cams 15 and 16 will have a relatively fixed setting and the cam 14 will be readily adjustable since its point of fixed operation determines the position of the parts at rest, as will be explained hereinafter.

Figure 5:
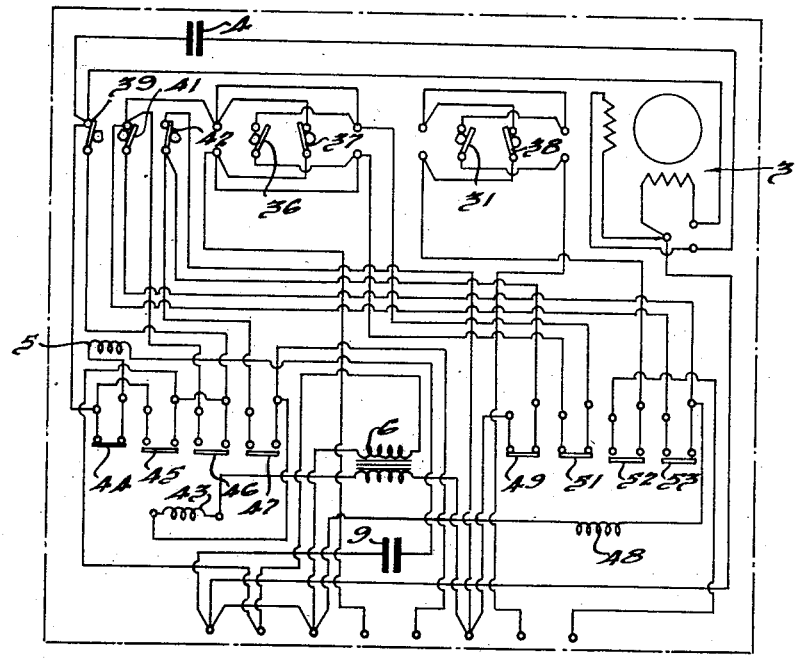
Figure 5 is a view showing the internal wiring diagram of the panel of Figure 1.
Figures 7, 8:
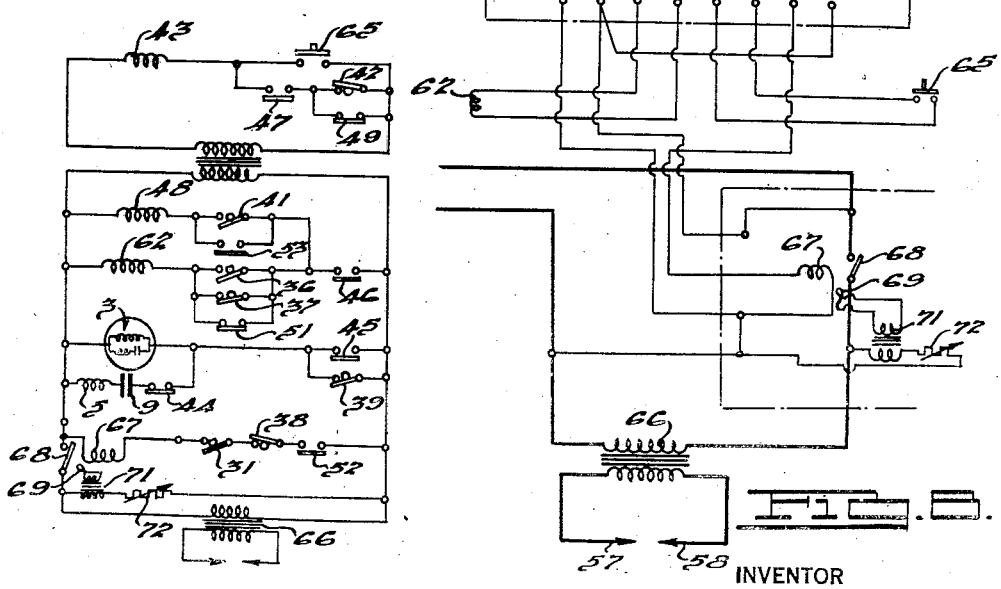
Figure 7 is a simplified schematic wiring diagram.
Figure 8 is a circle diagram showing points of contact operation.

The electromagnetic switch or relay 7 on the panel includes an operating coil 43 and four sets of cooperating contacts, a normally closed set of contacts 44 and three sets of normally open contacts 45, 46 and 47 shown in the Figures 5 and 7. The electromagnetic switch or relay 8 comprises an operating coil 48 and four sets of cooperating contacts, two of the sets, 49 and 51, being normally closed and two sets, 52 and 53, being normally open.

Figure 4 shows a schematic diagram of a welding tool or machine on which the method and system may be practiced. This comprises a frame 54 having an operating cylinder 55 within which is piston 56 carrying a movable electrode 57. A stationary electrode 58 is supported in the frame through an insulating bushing 59, power being let to the electrodes through conductors 61 from the secondary of the welder transformer, not here shown. The movements of the piston 56 are controlled through a solenoid valve which comprises an operating winding 62 and a slide 63. A source of fluid pressure 64 is provided, controlled by the solenoid valve to determine the position of the upper electrode. In the position shown in Figure 4, the coil 62 has just been de-energized so that the source of fluid pressure has now been connected to the under side of the piston whereupon the movable electrode will move upwardly to release the work as at the completion of a welding cycle.

In the external wiring diagram of Figure 6, in addition to the parts previously described, there are shown a push button control switch 65, a welding transformer 66, and a contactor in the primary of the welding transformer circuit which includes an operating coil 67 and cooperating contacts 68. Associated with this contactor is a synchronizing feature supplied by the auxiliary synchronizing coil 69 energized by the secondary of a transformer 71 in whose primary circuit is an adjustable resistor 72, adjustment of the resistor 72 determining the point on the supply wave at which the contacts separate, this contactor synchronization being more fully described and claimed in the copending application of Ernest G. Anger, Serial No. 204,052 filed April 25, 1938, for Electric switch, now Patent No. 2,273,311, dated Feb. 17, 1942.

Figure 8 is a circle diagram representing the points of actuation of the contacts which may be utilized in the operation of the method and system. It is understood that all of the contacts are adjustable in that either their mounting plates and/or their operating cams are adjustable with respect to the shaft 13. In the ordinary operation of the system, however, only the contacts 37, 31 and 38 and 39 will require adjustment, the contacts 41, 32 and 36 having a relatively fixed setting. The system provides a constant point of rest for the operating motor and timing switch, which constant stop point has been indicated at H on the circle diagram of contact operation.

The other points indicated on this diagram are as follows: point A where contact 37 opens; point B at which contact 42 opens; point C at which contact 36 closes; point D at which contact 41 closes; point E at which contact 39 opens; point F at which contact 31 closes and point G at which contact 38 opens. The points at which the alternative contact operations occur, i. e. the opening points for the contacts herein referred to as closing and the closing point for the contacts referred to as opening, do not affect the operation of the system.

To initiate a welding cycle after the work has been placed between the electrodes, the operator presses the push button starting switch 65. This may be only momentarily closed for a single weld, or the push button may be maintained closed to effect a plurality of welds in a series. Upon the closing of the push button switch 65, the operating coil 43 of the relay or switch 7 is immediately energized, closing its contacts 45, 46, and 47 and opening contact 44. The closing of contact 47 forms a holding circuit for the operating coil 33 through the normally closed contact 49 of relay or switch 8. The closing of contact 46 immediately energizes the operating coil 52 of the solenoid valve through the normally closed contact 51 of the relay 8. When the coil 62 is energized, the solenoid valve operates to apply pressure to the upper side of the piston 56 diagrammatically shown in Figure 4, whereupon the movable electrode 57 descends to apply pressure to the work. The closing of contact 45 energizes the synchronous motor 3 which then accelerates to its full operating speed. The opening of contact 44 disconnects the circuit through the plugging condenser 9 to disconnect it from around the motor 3 during the normal operation of the system.

The operating shaft 13 of the motor driven timing switch 2 rotates from the position of point H, which was taken as the rest point of the shaft, to the first point reached at A where contact 37 opens. This, however, has no effect in single welds and in the first of a series of welds, since the holding circuit about contact 37 is still provided by the normally closed contact 51 of relay 8. It is this normally closed contact which effects the additional "delay" time which is added to the normal "squeeze" time in single welds and in the first of a series of welds, as will be explained hereinafter. The cam shaft 13 continues to rotate until point B is reached, at which point contact 42 opens, again without effect since coil 43 is energized through the normally closed contact 49 of relay 8. The cam shaft continues to rotate to point C at which contact 36 closes but again without effect since the solenoid valve is already energized through the normally closed contact 51. At the next point D contact 41 closes to effect energization of the operating coil 48 of the relay 8 through the now closed contact 46 of relay 7.

Relay 8 is energized to effect opening of contacts 49 and 51 and closing of contacts 52 and 53. The closing of contact 53 forms a holding circuit for contact 58 around the cam operated contact 41. The opening of contact 51 opens the holding circuit about contacts 36 and 37 to the solenoid valve 62 and now places the control of the solenoid valve in the parallel connected, cam operated contacts 36 and 37. The opening of contact 49 removes the holding circuit around the cam operated contact 42 and places the control of the operating coil 43 in cam driven contact 42 when the push button 65 is released. The closing of contact 52 sets up the circuit to the operating coil 67 for the contacts 68 in the circuit to the primary of the welding transformer. As the cam shaft 13 continues to rotate, at point E the contact 39 is opened, but without effect, since it is short circuited by the now closed contact 45. At point F in the rotation of the cam shaft, contact 31 closes and this effects energization of the operating coil 67 to close the contact 68, and energizes the welding transformer to start the flow of current through the weld. The current continues to flow until point G is reached, at which point contact 38 opens to deenergize the coil 67 and effect opening of the contact 68. If a Syncro-break contactor is employed of the type disclosed in application Serial No. 204,052 aforesaid, the opening point of the contact 68 will be further controlled by the adjustment of the current in the auxiliary synchronizing coil 69. This interruption of the current completes the "weld" period in the welding cycle. As the shaft 18 continues to rotate, the point A is again reached and now the opening of contact 37 effects deenergization of the operating coil 62 of the solenoid valve and removes the pressure on the welding electrode to release the work.

If the push button has been maintained depressed, the shaft continues to rotate without operation in the system until point C is reached when contact 36 closes to again energize the operating coil 62 of the solenoid valve and reestablish welding pressure on the work. At points F and G, the welding current is applied and interrupted, and at point A the pressure is again released. This repetition of sequential pressure and current application and release is carried out to make successive welds in a series of welds so long as the push button is remained depressed.

Whenever the push button is released, either at the end of a series or after being momentarily closed for a single weld, the operations previously described take place and when the cam shaft reaches point B after the push button is released (and at least one weld completed) the opening of contact 42 effects deenergization of the operating coil 43 of the relay 7. The deenergization of this relay effects closing of contact 44 and opening of contacts 45, 46 and 47. The opening of contact 46 effects opening of the circuit to the solenoid valve 62 and deenergizes the operating coil 48 of relay 8 whose deenergization effects opening of contacts 52 and 53 and closing of contacts 49 and 51. The opening of contact 45 places the control of the motor circuit in the cam operated contacts 39. The closing of contact 44 again closes the circuit to the plugging condenser 9 which is now connected in parallel with the motor winding. The opening of contact 52 opens the circuit to the welder contactor and prevents closing thereof as the cam shaft continues to rotate. After the operations just described, points C and D are passed in the rotation of the shaft without effecting operation of the elements of the system, since the circuit thereto is open at contact 46. At the point E contact 39 is opened. This disconnects the motor from the line and permits the condenser 9 to discharge through the motor winding. This condenser discharge effects a very quick stopping of the motor and at the same predetermined point, such as the point H indicated on the circle diagram on Figure 8. The system is now at rest and is prepared for the initiation of a new welding cycle.

The positioning motor at rest at a predetermined point in the rotation of the cam shaft provides obvious advantages in the system, since it is unnecessary to have the motor rotate constantly and unnecessary to have an initiating relay which would be picked up at one point in the operation of the shaft. Furthermore, the positive position of the motor at rest makes the total elapsed time between the closing of the push button and the making of the first weld become constant. This positive positioning further provides a definite "delay" time for single welds and the first weld in a series of welds. This plugging or braking to a definite predetermined position is very efficiently effected by the use of the plugging condenser 9 which feeds back or discharges through the motor winding to effect the quick stopping thereof. For most efficient operation, it is desired to have the condenser discharge to brake the motor when the maximum energy is stored therein. It is further desirable that this charge on the condenser for braking be maintained constant to avoid the possibility of variable braking which would occur if the motor and condenser were disconnected from the line at some point other than current zero. Since the contact 39 is synchronously driven, the adjustment of its cam operator with respect to the shaft 37 may be set so as to insure opening of the contacts when the current therethrough has an instantaneous value of zero. To further effect this interruption of the motor circuit when the current is zero, the reactor 5 is placed in series with the condenser so that should the contacts 39 actually separate at a point other than current zero, through misadjustment thereof, the inductance in the circuit provided by the reactor 5 will cause arcing at the contact tips to pass current until the arc is interrupted at the zero point of the current cycle. Accordingly, it is seen that the condenser and motor circuit will be interrupted, either through the accurate positioning of the contact operating cam or by the arcing at the contacts, when the current has an instantaneous value of zero and a substantially constant and maximum charge on the condenser will be used to effect constant braking of the driving motor.

Again referring to the circle diagram of Figure 8, the portion of the rotation of the cam shaft 18 represented by the arc between point H and point C represents the "delay" time during which the pressure is building up on the work and which is utilized only for single welds and for the first in a series of welds. This additional time adds on to the "squeeze" time normally provided for each weld in a continuous series of welds. The desire for this additional time for single and initial welds is necessitated by various factors such as additional friction in the welding tool, a greater movement of parts, and other reasons which require a longer time to build up adequate welding pressure after the solenoid valve is energized after the system is at rest. This additional "delay" time is provided through the normally closed contact 51 of relay 8 which permits energization of the operating coil 62 of the solenoid valve immediately the contact 46 closes, which closing is effected when the push button is initially closed. However, contact 51 being opened when relay 8 is energized, places the control of the solenoid valve, so long as relay 8 remains energized, in the contacts 36 and 37 so that after the first weld in a continuous series of welds is completed, the solenoid valve will therefore be energized only at the point C in the welding cycle so that the "delay" time does not occur in other than in single welds or in the first of a series of welds. In all welds, a "squeeze" time represented by the arc between points C and F is provided. In the case of single welds and the first in a series of welds, this time is simply added to the "delay" time represented by the arc H—C so that the total time between energization of the solenoid valve and application of current is represented by the long arc H—F for single welds and the first in a series of welds. The "weld" time in the welding cycle is represented by the arc F—G during which the welding transformer primary is energized to pass current through the work. The "hold" time in the welding cycle is represented by the arc G—A in which the pressure on the electrodes is maintained after current has ceased to flow. The "off" time in the welding cycle where a continuous series of welding cycles is being effected is represented by the arc A—C in which pressure is released.

In the circle diagram of Figure 8 it is seen that points B, C and D are relatively constant and need not ordinarily be adjusted after the factory adjustment of the timing switch. However, points E, F, G and A are made readily adjustable on the timing switch, since the relation of point F with respect to point C determines the "squeeze" time and the relation of point G with respect to point F determines the "weld" time, and the relation of point A with respect to point G determines the "hold" time; also, the relation of point E determines the stopping point of the motor and hence determines the "delay" period which might vary with specific welding applications, as may also the minimum time required for the motor to accelerate the synchronous speed. The adjustment of points F, G and H is effected by movement of the handles 27 which rotate contacts 31, 38 and 37 with respect to the operating cam shaft and hence determine the points at which contact operation is effected. The adjustment of point E may be effected by changing the position of cam 14 on the cam shaft 13.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. A method of operating upon a work circuit which comprises closing an initiating switch, energizing an electric relay when said initiating switch is closed, energizing a fluid pressure control means to establish a work circuit and the driving motor of a motor driven timing switch when said relay is energized, energizing a second relay when said timing switch rotates to a predetermined position, placing the control of the energization of the fluid pressure control means in the contacts of said timing switch when said second relay is energized, energizing and deenergizing said work circuit to pass current therethrough in predetermined positions of the timing switch, deenergizing the fluid pressure control means in another predetermined position of the timing switch, deenergizing said first relay in another predetermined position of the timing switch provided the initiating switch has, in the meantime, been opened, deenergizing the second relay when the first relay is deenergized, and deenergizing the driving motor of said timing switch in another predetermined position of said timing switch.

2. A method of operating upon a work circuit which comprises closing an initiating switch, energizing an electric relay when said initiating switch is closed, energizing a fluid pressure control to establish a work circuit and the driving motor of a motor driven timing switch when said relay is energized, energizing a second relay when said timing switch moves to a predetermined position, placing the control of the energization of the fluid pressure control means in the contacts of said timing switch when said second relay is energized, energizing and deenergizing said work circuit to pass current therethrough in predetermined positions of the timing switch, deenergizing the fluid pressure control means in another predetermined position of the timing switch, deenergizing said first relay in another predetermined position of the timing switch provided the initiating switch has, in the meantime, been opened, deenergizing the second relay when the first relay is deenergized, deenergizing the driving motor of said timing switch in another predetermined position of said timing switch, and braking said driving motor and timing switch to a stop in a predetermined position thereof.

3. A method of operating upon a work circuit which comprises closing an initiating switch, energizing an electric relay when said initiating switch is closed, energizing a fluid pressure control means to establish a work circuit and the driving motor of a motor driven timing switch when said relay is energized, energizing a second relay when said timing switch moves to a predetermined position, placing the control of the energization of the fluid pressure control means in the contacts of said timing switch when said second relay is energized, energizing and deenergizing said work circuit to pass current therethrough in predetermined positions of the timing switch, deenergizing the fluid pressure control means in another predetermined position of the timing switch, deenergizing said first relay in another predetermined position of the timing switch provided the initiating switch has, in the meantime, been opened, deenergizing the second relay when the first relay is deenergized, deenergizing the driving motor of said timing switch in another predetermined position of the timing switch, and discharging a condenser through windings of the driving motor so as to brake the timing switch to a stop in a predetermined position.

4. A method of operating upon a work circuit which comprises closing an initiating switch, energizing an electric relay when said initiating switch is closed, energizing a fluid pressure control means to establish a work circuit and the driving motor of a motor driven timing switch when said relay is energized, energizing a second relay when said timing switch moves to a predetermined position, placing the control of the energization of the fluid pressure control means in the contacts of said timing switch when said second relay is energized, energizing and deenergizing said work circuit to pass current therethrough in predetermined positions of the timing switch, deenergizing the fluid pressure control means in another predetermined position of the timing switch, deenergizing said first relay in another predetermined position of the timing switch provided the initiating switch has, in the meantime, been opened, deenergizing the second relay when the first relay is deenergized, deenergizing the driving motor of the timing switch in another predetermined position of said timing switch, connecting a condenser in parallel with the windings of said driving motor prior to the interruption of the circuit therethrough, and discharging the said condenser through the motor windings after interruption of the motor circuit to effect stopping of the motor driven switch in a predetermined position.

5. A method of operating upon a work circuit which comprises closing an initiating switch, energizing an electric relay when said initiating switch is closed, energizing a fluid pressure control means to establish a work circuit and the driving motor of a motor driven timing switch when said relay is energized, energizing a second relay when said timing switch moves to a predetermined position, placing the control of the energization of the fluid pressure control means in the contacts of said timing switch when said second relay is energized, energizing and deenergizing said work circuit to pass current therethrough in predetermined positions of the timing switch, deenergizing the fluid pressure control means in another predetermined position of the timing switch, deenergizing said first relay in another predetermined position of the timing switch provided the initiating switch has, in the meantime, been opened, deenergizing the second relay when the first relay is deenergized, deenergizing the driving motor of the timing switch in another predetermined position of said motor driven switch, connecting a condenser in parallel with the motor windings, interrupting the motor circuit when current therethrough has an instantaneous value of substantially zero to effect a maximum charge on the condenser, and discharging said condenser through the motor windings to brake the motor driven switch to a stop in a predetermined position.

6. A method of operating upon a work circuit which comprises closing an initiating switch, energizing an electric relay when said initiating switch is closed, energizing a fluid pressure control means to establish a work circuit and the driving motor of a motor driven timing switch when said relay is energized, energizing a second relay when said timing switch moves to a predetermined position, placing the control of the energization of the fluid pressure control means in the contacts of said timing switch when said second relay is energized, energizing and deenergizing said work circuit to pass current therethrough in predetermined positions of the timing switch, deenergizing the fluid pressure control means in another predetermined position of the timing switch, continuing to initiate and release pressure and pass current through the work circuit in predetermined sequence so long as said initiating means remains closed and without deenergizing said relays, deenergizing said first relay in another predetermined position of the timing switch providing the initiating switch has, in the meantime, been opened, deenergizing the second relay when the first relay is deenergized, and deenergizing the driving motor of the timing switch in another predetermined position of said timing switch.

7. The steps in a method of electric welding to secure a constant "delay" time added to the "squeeze" time in the case of single welds and in the first of a series of welds which comprises starting a motor driven timing switch from a predetermined position to initiate a weld and energizing fluid pressure electrode control means when the motor driven switch is started independent of the contacts of the motor driven switch in the case of single welds and the first weld of a series, thereafter controlling the "squeeze" period in the welding cycle solely by the contacts of the motor driven switch without the addition of a "delay" period in welds other than the first in a series, and stopping said motor driven switch in a predetermined position after the completion of a series of welds so that it will be properly located for the application of the constant "delay" period in the next initiation of a welding cycle.

8. In a welder control system for electrically welding work by passing current therethrough between electrodes pressed against the work by fluid pressure, a motor driven timing switch having a plurality of sequentially operated contact sets, an initiating switch, means controlling the application of the fluid pressure, means for immediately starting said motor and energizing said fluid pressure control means independently of the contacts of the timing switch when the initiating switch is actuated, means placing the control of the energization of the fluid pressure control means in the contacts of said timing switch when the switch is in a predetermined position, means controlled by contacts on said timing switch for passing current through the weld during a predetermined period of movement of the timing switch, said timing switch discontinuing the energization of the fluid pressure control means in another predetermined position, the application of pressure and passage of current being thereafter entirely under the control of the contacts of the motor driven switch and continuing in sequence to perform a continuous series of welds as long as the initiating switch remains actuated, the immediate energization of the fluid pressure control means when the initiating switch is actuated, prior to the actuation of the timing switch contacts which control such energization in a continuous series, providing an additional "delay" time added to the normal "squeeze" time in the welding cycle in the case of single welds and the first weld in a series of welds.

9. In a welder control system for electrically welding work by passing current therethrough between electrodes pressed against the work by fluid pressure, a motor driven timing switch having a plurality of sequentially operated contact sets, an initiating switch, means controlling the application of the fluid pressure, means for immediately starting said motor and energizing said fluid pressure control means independently of the contacts of the timing switch when the initiating switch is actuated, means placing the control of the energization of the fluid pressure control means in the contacts of said timing switch when the switch is in a predetermined position, means controlled by contacts on said timing switch for passing current through the weld during a predetermined period of movement of the timing switch, said timing switch discontinuing the energization of the fluid pressure control means in another predetermined position, the application of pressure and passage of current being thereafter entirely under the control of the contacts of the timing switch and continuing in sequence to perform a continuous series of welds as long as the initiating switch remains actuated, the immediate energization of the fluid pressure control means when the initiating switch is actuated, prior to the actuation of the timing switch contacts which control such energization in a continuous series, providing an additional "delay" time added to the normal "squeeze" time in the welding cycle in the case of single welds and the first weld in a series of welds, means for deenergizing the control system when the last weld in a series has been completed, the deenergization of the system affecting return of said means which places the control of the fluid pressure control means in the contacts of the timing switch into a position where the control of the energization of the fluid pressure control means is again effected independently of the contacts of the timing switch when the initiating switch is actuated.

10. In a welder control system for electrically welding work by passing current therethrough between electrodes pressed against the work by fluid pressure, a motor driven timing switch having a plurality of sequentially operated contact sets, an initiating switch, means controlling the application of the fluid pressure, means for immediately starting said motor and energizing said fluid pressure control means independently of the contacts of the timing switch when the initiating switch is actuated, means placing the control of the energization of the fluid pressure control means in the contacts of said timing switch when the switch is in a predetermined position, means controlled by contacts on said timing switch for passing current through the weld during a predetermined period of movement of the timing switch, said timing switch discontinuing the energization of the fluid pressure control means in another predetermined position, the application of pressure and passage of current being thereafter entirely under the control of the contacts of the timing switch and continuing in sequence to perform a continuous series of welds as long as the initiating switch remains actuated, the immediate energization of the fluid pressure control means when the initiating switch is actuated, prior to the actuation of the timing switch contacts which control such energization in a continuous series, providing an additional "delay" time added to the normal "squeeze" time in the welding cycle in the case of single welds and the first weld in a series of welds, means for deenergizing the control system when the last weld in a series has been completed, and means for stopping said timing switch in a predetermined position so that the reenergization of the fluid pressure control means independently of the contacts of the timing switch when the initiating switch is again actuated will be effected when the timing switch is in a predetermined position.

11. In a welder control system for electrically welding work by passing current therethrough between electrodes pressed against the work, a motor driven timing switch incorporating a plurality of sets of main contacts and at least three auxiliary sets of contacts, a pair of relays, an initiating switch, means for energizing one of said relays when said initiating switch is actuated, means for initiating welding pressure and for starting the motor driven timing switch when said first relay is closed, means for energizing the second relay through one of said auxiliary contacts in a predetermined position of the timing switch, means for starting and stopping the passage of current through the weld under the control of certain of said main contacts in a predetermined position of said timing switch, means for releasing the electrode pressure under the control of certain of said main contacts in another predetermined position of the timing switch, means for deenergizing said first relay by a second of said auxiliary contacts in a predetermined position of the timing switch, deenergization of said first relay effecting the deenergization of said second relay, and means for disconnecting the motor circuit through the third of said auxiliary contacts in another predetermined position of the timing switch.

12. In a welder control system for electrically welding work by passing current therethrough between electrodes pressed against the work, a motor driven timing switch incorporating a plurality of sets of main contacts and at least three auxiliary sets of contacts, a pair of relays, an initiating switch, means for energizing one of said relays when said initiating switch is actuated, means for initiating welding pressure and for starting the motor driven timing switch when said first relay is closed, means for energizing the second relay through one of said auxiliary contacts in a predetermined position of the timing switch, means for starting and stopping the passage of current through the weld under the control of certain of said main contacts in a predetermined position of said timing switch, means for releasing the electrode pressure under the control of certain of said main contacts in another predetermined position of the timing switch, means for deenergizing said first relay by a second of said auxiliary contacts in a predetermined position of the timing switch, deenergization of said first relay effecting the deenergization of said second relay, means for disconnecting the motor circuit through the third of said auxiliary contacts in another predetermined position of the timing switch, and means for braking the timing switch to a stop in a predetermined position.

13. In a welder control system for electrically welding work by passing current therethrough between electrodes pressed against the work, a motor driven timing switch incorporating a plurality of sets of main contacts and at least three auxiliary sets of contacts, a pair of relays, an initiating switch, means for energizing one of said relays when said initiating switch is actuated, means for initiating welding pressure and for starting the motor driven timing switch when said first relay is closed, means for energizing the second relay through one of said auxiliary contacts in a predetermined position of the timing switch, means for starting and stopping the passage of current through the weld under the control of certain of said main contacts in a predetermined position of said timing switch, means for releasing the electrode pressure under the control of certain of said main contacts in another predetermined position of the timing switch, means for deenergizing said first relay by a second of said auxiliary contacts in a predetermined position of the timing switch, but only if said initiating means has been opened, deenergization of said first relay effecting deenergization of said second relay, means for disconnecting the motor circuit through the third of said auxiliary contacts in another predetermined position of the timing switch, but only if said relays have been deenergized, means whereby if said initiating means has been maintained closed the relays will remain energized continuously during such closure and the application and release of pressure and the passage of current will be sequentially effected through the main contacts of the motor driven switch to effect a continuous series of welds until the initiating means is opened, whereupon the opening of the first relay by the second auxiliary contact and the successive operations thereafter will be effected when the timing switch is in predetermined positions after such opening of the initiating means.

14. In a welder control system for electrically welding work by passing current therethrough between electrodes pressed against the work, means controlling the application and release of pressure to the electrodes, means controlling the passage of current through the work, a timing switch having at least four sequentially operated sets of contacts thereon, means connecting two of said sets of contacts in parallel to control the energization of the means controlling the application and release of pressure whereby said means controlling the application and release of pressure will remain energized while either of said two sets of contacts are closed, and means connecting two other sets of said contacts in series and to control passage of current through the work whereby current will flow only in the overlapped period in which both of said last two sets of said contacts are closed.

FRANK H. ROBY.